(12) United States Patent
Kikuchi et al.

(10) Patent No.: US 8,871,667 B2
(45) Date of Patent: Oct. 28, 2014

(54) ZEOLITE STRUCTURE AND MANUFACTURING METHOD THEREOF

(75) Inventors: Yoshio Kikuchi, Nagoya (JP); Haruo Otsuka, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 667 days.

(21) Appl. No.: 13/050,302

(22) Filed: Mar. 17, 2011

(65) Prior Publication Data

US 2011/0236271 A1 Sep. 29, 2011

(30) Foreign Application Priority Data

Mar. 25, 2010 (JP) ................................. 2010-070090

(51) Int. Cl.
*B01J 29/00* (2006.01)
*B01J 29/04* (2006.01)
(Continued)

(52) U.S. Cl.
CPC . *B01J 35/04* (2013.01); *B01J 29/40* (2013.01); *B01D 2255/9155* (2013.01); *Y02C 10/08* (2013.01); *B01D 53/9413* (2013.01); *B01J 29/80* (2013.01); *B01J 29/7007* (2013.01); *B01J 20/2803* (2013.01); *B01J 20/28045* (2013.01); *B01J 29/46* (2013.01); *B01J 29/06* (2013.01); *B01J 29/061* (2013.01); *B01D 2257/702* (2013.01); *B01J 2229/42* (2013.01); *B01D 2255/50* (2013.01); *B01D 2253/108* (2013.01); *Y02T 10/22* (2013.01); *B01J 29/7615* (2013.01); *B01J 20/186* (2013.01); *B01D 53/945* (2013.01); *B01J 37/0009* (2013.01); *B01D 53/04* (2013.01); *B01J 35/023* (2013.01); *B01D 53/02* (2013.01)
USPC ................... 502/60; 502/77; 502/78; 502/79; 502/439

(58) Field of Classification Search
CPC ............................ B01J 35/023; B01J 2229/42
See application file for complete search history.

(56) References Cited

U.S. PATENT DOCUMENTS

| 6,555,492 B2 | 4/2003 | Faber et al. | |
|---|---|---|---|
| 2007/0190350 A1* | 8/2007 | Ohno et al. | 428/593 |

(Continued)

FOREIGN PATENT DOCUMENTS

| EP | 2 130 591 A2 | 12/2009 |
|---|---|---|
| JP | 2006-104028 A1 | 4/2006 |

(Continued)

OTHER PUBLICATIONS

U.S. Appl. No. 13/050,381, filed Mar. 17, 2011, Yoshio Kikuchi.

(Continued)

*Primary Examiner* — Melvin C Mayes
*Assistant Examiner* — Colin W Slifka
(74) *Attorney, Agent, or Firm* — Burr & Brown, PLLC (57) ABSTRACT

The zeolite structure includes a zeolite material containing a plurality of zeolite particles and an inorganic binding material which binds the zeolite particles to one another, the plurality of zeolite particles include fine zeolite particles having a small average particle diameter and coarse zeolite particles which have an average particle diameter of three or more times the average particle diameter of the fine zeolite particles and which are not an agglomerated material of primary particles, a ratio of volumes of the coarse zeolite particles with respect to the whole volume of the plurality of zeolite particles is from 40 to 90 vol %, in the zeolite material, a ratio of a volume of the inorganic binding material is from 5 to 50 vol %, and a zeolite raw material containing the plurality of zeolite particles and the inorganic binding material is extruded to form a zeolite structure.

17 Claims, 2 Drawing Sheets

(51) Int. Cl.

| | | |
|---|---|---|
| *B01J 29/064* | (2006.01) | |
| *B01J 29/068* | (2006.01) | |
| *B01J 29/072* | (2006.01) | |
| *B01J 29/076* | (2006.01) | |
| *B01J 29/08* | (2006.01) | |
| *B01J 29/18* | (2006.01) | |
| *B01J 29/40* | (2006.01) | |
| *B01J 29/65* | (2006.01) | |
| *B01J 29/70* | (2006.01) | |
| *B01J 29/80* | (2006.01) | |
| *B01J 29/10* | (2006.01) | |
| *B01J 29/12* | (2006.01) | |
| *B01J 29/14* | (2006.01) | |
| *B01J 29/16* | (2006.01) | |
| *B01J 29/20* | (2006.01) | |
| *B01J 29/22* | (2006.01) | |
| *B01J 29/24* | (2006.01) | |
| *B01J 29/26* | (2006.01) | |
| *B01J 29/42* | (2006.01) | |
| *B01J 29/44* | (2006.01) | |
| *B01J 29/46* | (2006.01) | |
| *B01J 29/48* | (2006.01) | |
| *B01J 29/66* | (2006.01) | |
| *B01J 29/67* | (2006.01) | |
| *B01J 29/68* | (2006.01) | |
| *B01J 29/69* | (2006.01) | |
| *B01J 29/72* | (2006.01) | |
| *B01J 29/74* | (2006.01) | |
| *B01J 29/76* | (2006.01) | |
| *B01J 29/78* | (2006.01) | |
| *B01J 20/28* | (2006.01) | |
| *B01J 29/06* | (2006.01) | |
| *B01J 20/18* | (2006.01) | |
| *B01J 35/04* | (2006.01) | |
| *B01J 37/00* | (2006.01) | |
| *B01J 35/02* | (2006.01) | |
| *B01D 53/02* | (2006.01) | |
| *B01D 53/94* | (2006.01) | |
| *B01D 53/04* | (2006.01) | |

(56) References Cited

U.S. PATENT DOCUMENTS

| | | |
|---|---|---|
| 2007/0259770 A1 | 11/2007 | Hofmann et al. |
| 2009/0291253 A1 | 11/2009 | Ohno et al. |
| 2009/0291839 A1* | 11/2009 | Kunieda et al. ............... 502/74 |
| 2009/0305873 A1 | 12/2009 | Ohno et al. |

FOREIGN PATENT DOCUMENTS

| | | |
|---|---|---|
| JP | 3862161 B2 | 12/2006 |
| JP | 2007-296521 A1 | 11/2007 |
| JP | 2008-169104 A1 | 7/2008 |
| WO | 2009/141878 A1 | 11/2009 |
| WO | 2009/141886 A1 | 11/2009 |

OTHER PUBLICATIONS

U.S. Appl. No. 13/052,352, filed Mar. 21, 2011, Yoshio Kikuchi.
U.S. Appl. No. 13/052,390, filed Mar. 21, 2011, Yoshio Kikuchi.
U.S. Appl. No. 13/069,753, filed Mar. 23, 2011, Yoshio Kikuchi.

* cited by examiner

ZEOLITE STRUCTURE AND MANUFACTURING METHOD THEREOF

BACKGROUND OF THE INVENTION

1. Field of the Invention

The present invention relates to a zeolite structure, and a manufacturing method of the zeolite structure. More particularly, it relates to a zeolite structure having an excellent mechanical strength, and a manufacturing method of the zeolite structure.

2. Description of the Related Art

It is known that zeolite is a type of silicate having a mesh crystal structure provided with fine pores having a uniform diameter, there are present various chemical compositions represented by the general formula: $W_mZnO_{2n}\cdot sH_2O$ (W: sodium, potassium, calcium or the like, Z: silicon, aluminum or the like, and s takes various values), and there are present many kinds (types) of crystal structures having different pore shapes. Zeolite has an inherent adsorption ability, catalyst performance, solid acid characteristics, ion exchange ability and the like based on the respective chemical compositions or crystal structures, and is utilized in various use applications such as an adsorbing material, a catalyst, a catalyst carrier, a gas separation film and an ion exchanger.

For example, MFI-type zeolite (also referred to as "ZSM-5 type zeolite") is provided with pores each having a size of about 0.5 nm by oxygen ten-membered rings among crystals, and is utilized in a use application such as an adsorbing material for adsorbing nitrogen oxides (NOx), hydrocarbons (HC) or the like in a car exhaust gas, or a gas separation film for selectively separating only p-xylene from a xylene isomer. Moreover, Deca-Dodecasil 3R (DDR) type zeolite is zeolite provided with pores of about 0.44×0.36 nm by oxygen eight-membered rings among crystals, and is utilized in a use application such as a gas separation film for selectively separating/removing only carbon dioxide from a natural gas or a biological gas to improve purity of methane which is useful as a fuel.

Moreover, for the purpose of removing NOx or the like contained in an exhaust gas discharged from an engine for a car, an engine for a construction machine, an industrial stational engine, a burning apparatus or the like or adsorbing hydrocarbons or the like contained in the exhaust gas, as a ceramic carrier (a honeycomb structure) made of cordierite or the like and having a honeycomb shape, there is used a catalyst material onto which zeolite subjected to an ion exchange treatment is loaded.

When zeolite is loaded onto the above ceramic carrier made of cordierite or the like, cordierite or the like does not exert a function of purifying NOx, a function of adsorbing hydrocarbons or the like. Therefore, when cordierite or the like is present, a pressure loss during passing of the exhaust gas increases.

To solve this problem, there is suggested a method of forming and firing a forming material containing zeolite subjected to the ion exchange treatment between cations of zeolite and metal ions, to form a honeycomb structure itself (e.g., see Patent Documents 1 to 6).

[Patent Document 1] JP-A-2008-169104
[Patent Document 2] JP-A-2006-104028
[Patent Document 3] Japanese Patent No. 3862161
[Patent Document 4] JP-A-2007-296521
[Patent Document 5] U.S. Pat. No. 6,555,492
[Patent Document 6] WO2009/141878A1

SUMMARY OF THE INVENTION

However, such a conventional zeolite structure has a problem that a charge ratio of zeolite in the zeolite structure is low and that a mechanical strength such as a bending strength is low. In particular, when the honeycomb structure itself is made of zeolite and is installed and used in an exhaust system of a car, the conventional zeolite structure has a problem such as breakdown or deformation due to vibration of the car or the like.

Moreover, even in the conventional zeolite structure, when a large amount of binding material for binding zeolite particles is contained, the mechanical strength of the structure can be improved to a certain degree. However, the ratio of zeolite included in the zeolite structure lowers, which causes a problem that a purification performance deteriorates.

The present invention has been developed in view of the above problem, and an object thereof is to provide a zeolite structure having an excellent mechanical strength and a manufacturing method of the zeolite structure.

The present inventor has intensively performed investigation to solve the above problem of a conventional technology, and has considered that as zeolite particles which are aggregates of the zeolite structure, fine zeolite particles having a small average particle diameter and coarse zeolite particles having an average particle diameter which is three or more times the average particle diameter of the fine zeolite particles are mixed at a predetermined ratio to obtain a raw material which is extruded, whereby a charge ratio of the formed zeolite structure can be increased, to solve the above problem, thereby completing the present invention. Specifically, according to the present invention, the zeolite structure and the manufacturing method thereof are provided as follows.

[1] A zeolite structure comprising: a zeolite material containing a plurality of zeolite particles and an inorganic binding material which binds the zeolite particles to one another, wherein the plurality of zeolite particles include fine zeolite particles having a small average particle diameter and coarse zeolite particles which have an average particle diameter of three or more times the average particle diameter of the fine zeolite particles and which are not an agglomerated material of primary particles, a ratio of volumes of the coarse zeolite particles with respect to the whole volume of the plurality of zeolite particles is from 40 to 90 vol %, in the zeolite material, a ratio of a volume of the inorganic binding material with respect to the whole volume of the zeolite material is from 5 to 50 vol %, and a zeolite raw material containing the plurality of zeolite particles and the inorganic binding material is extruded to form the zeolite structure.

[2] The zeolite structure according to the above [1], wherein zeolite particles of at least a part of the plurality of zeolite particles are particles made of at least one type of zeolite selected from the group consisting of ZSM-5 type zeolite, β-type zeolite, Y-type zeolite, mordenite type zeolite and ferrierite type zeolite.

[3] The zeolite structure according to the above [1] or [2], wherein zeolite particles of at least a part of the plurality of zeolite particles are particles made of zeolite subjected to ion exchange between cations of zeolite and ions of at least one metal selected from the group consisting of copper, iron, nickel, zinc, manganese, cobalt, silver, palladium, indium, cerium, gallium, titanium and vanadium.

[4] The zeolite structure according to the above [3], wherein the fine zeolite particles and the coarse zeolite particles are particles made of zeolite subjected to ion exchange between cations of zeolite and different types of the metal ions, respectively.

[5] The zeolite structure according to the above [4], wherein the fine zeolite particles are particles made of zeolite subjected to ion exchange between cations of zeolite and ions of at least one type of metal selected from the group consisting of iron, titanium and cobalt, and the coarse zeolite particles are particles made of zeolite subjected to ion exchange between cations of zeolite and ions of at least one type of metal selected from the group consisting of copper, manganese, silver, and vanadium.

[6] The zeolite structure according to any one of the above [1] to [5], wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

[7] The zeolite structure according to any one of the above [1] to [6], which is formed in a honeycomb shape including partition walls disposed to form a plurality of cells which become through channels of a fluid and which extend from one end face to the other end face.

[8] A manufacturing method of a zeolite structure, comprising: a step of mixing zeolite powder obtained by mixing fine zeolite particles having a small average particle diameter and coarse zeolite particles having an average particle diameter which is three or more times the average particle diameter of the fine zeolite particles, an inorganic binding material which binds the zeolite particles constituting the zeolite powder, and an organic binder, to prepare a zeolite raw material; a step of extruding the obtained zeolite raw material to obtain a formed zeolite article; and a step of firing the obtained formed zeolite article to prepare the zeolite structure, wherein the step of preparing the zeolite raw material includes the steps of using, as the zeolite powder, zeolite powder containing 40 to 90 vol % of the coarse zeolite particles with respect to the whole volume of the zeolite powder, and adding 5 to 50 vol % of the inorganic binding material to the total volume of 100 vol % of the zeolite powder and the inorganic binding material in terms of a solid content, to prepare the zeolite raw material.

The zeolite structure of the present invention is formed by extruding the zeolite raw material obtained by mixing, at the predetermined ratio, the powder of the zeolite particles including classified fine zeolite particles having a small average particle diameter and classified coarse zeolite particles having an average particle diameter which is three or more times the average particle diameter of the fine zeolite particles, and the inorganic binding material which binds the zeolite particles, whereby a charge ratio of the zeolite structure becomes high. In other words, a porosity of the zeolite structure lowers, and a mechanical strength is high. In particular, even when the amount of the binding material for binding the zeolite particles is decreased, the mechanical strength can be increased. Therefore, the ratio of zeolite included in the zeolite structure can be raised, and the zeolite structure has an excellent purification performance.

Moreover, the zeolite particles having large particle diameters have a high heat resistance. On the other hand, the zeolite particles having small particle diameters have an excellent purification performance. Therefore, when the fine zeolite particles and the coarse zeolite particles are mixed at a predetermined ratio and used, both the heat resistance and the purification performance can be enhanced.

Furthermore, in the manufacturing method of the zeolite structure of the present invention, it is possible to easily and inexpensively manufacture the zeolite structure having a high charge ratio of the above aggregate and an excellent mechanical strength.

DETAILED DESCRIPTION OF THE INVENTION

Next, a configuration for carrying out the present invention will be described in detail with reference to the drawings, but it should be understood that the present invention is not limited to the following embodiment, and design modification, improvement and the like are appropriately added to the present invention based on knowledge of a person with ordinary skill without departing from the scope of the present invention.

Figure 1:
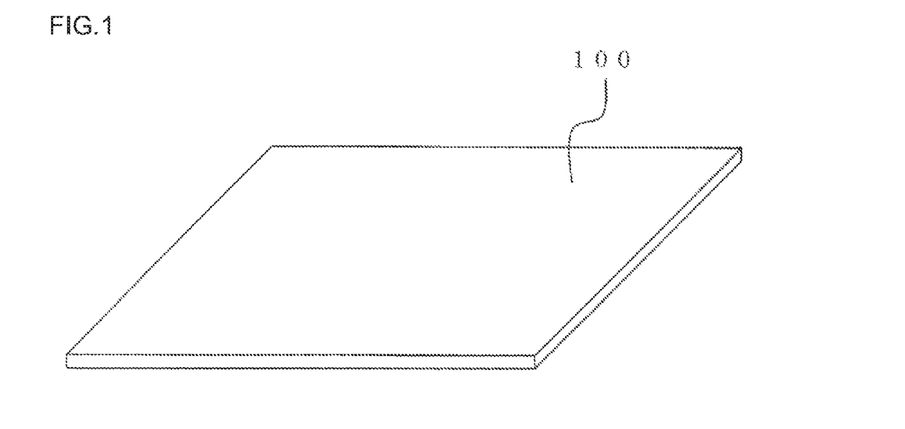
FIG. 1 is a perspective view schematically showing one embodiment of a zeolite structure of the present invention.
Figure 2:
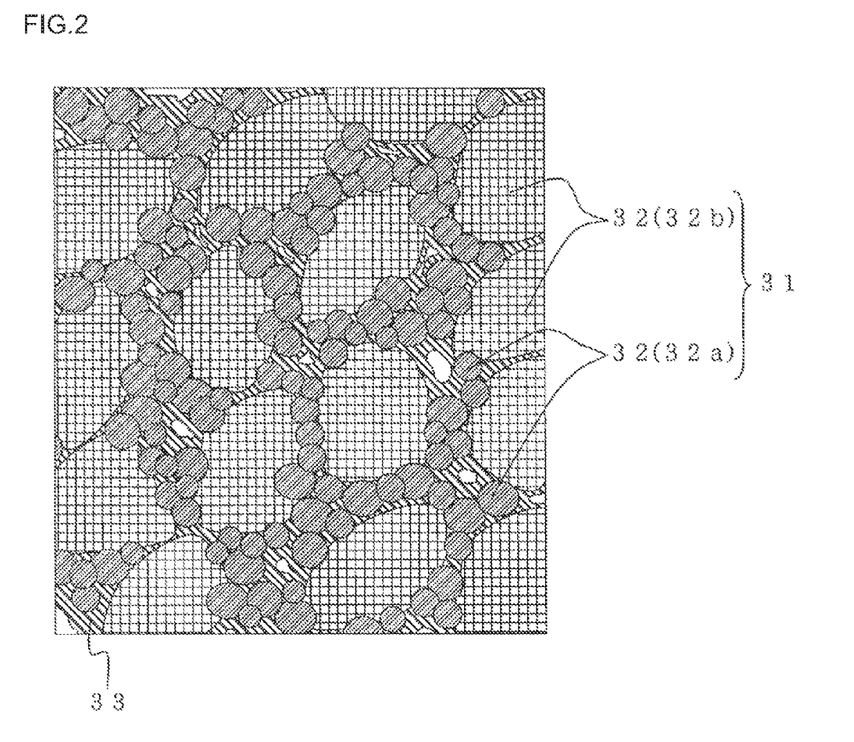
FIG. 2 is an enlarged view schematically showing a binding state of zeolite particles and an inorganic binding material in a section of the zeolite structure of FIG. 1 which is vertical to the surface thereof.

(1) Zeolite Structure:

As shown in FIG. 1 and FIG. 2, an embodiment of a zeolite structure of the present invention is a zeolite structure 100 made of a zeolite material containing a plurality of zeolite particles 32 and an inorganic binding material 33 which binds the plurality of zeolite particles 32 to one another. The zeolite structure 100 of the present embodiment is a structure formed by extruding a zeolite raw material containing at least the zeolite particles and inorganic binding material. Here, FIG. 1 is a perspective view schematically showing the embodiment of the zeolite structure of the present invention, and FIG. 2 is an enlarged view schematically showing a binding state of the zeolite particles and the inorganic binding material in a section of the zeolite structure of FIG. 1 which is vertical to the surface thereof. It is to be noted that reference numeral 31 is zeolite powder including the plurality of zeolite particles 32.

Moreover, the plurality of zeolite particles 32 constituting the zeolite structure 100 of the present embodiment include fine zeolite particles 32a having a small average particle diameter and coarse zeolite particles 32b which have an average particle diameter of three or more times the average particle diameter of the fine zeolite particles 32a and which are not an agglomerated material of primary particles. A ratio of a volume of the coarse zeolite particles 32b with respect to the whole volume of the plurality of zeolite particles 32 (hereinafter referred to simply as "the ratio of the volume of the coarse zeolite particles" sometimes) is from 40 to 90 vol %.

Moreover, in the zeolite material of the zeolite structure 100 of the present embodiment, the ratio of the volume of the inorganic binding material with respect to the whole volume of the zeolite material (hereinafter referred to simply as "the volume ratio of the inorganic binding material" sometimes) is from 5 to 50 vol %.

According to such a constitution of the zeolite structure of the present embodiment, the charge ratio of the zeolite structure (i.e., the charge ratio of the zeolite particles as aggregates in the zeolite structure) becomes high, whereby a porosity of the zeolite structure lowers, and a mechanical strength thereof becomes high. In particular, even when the amount of the inorganic binding material for binding the zeolite particles is decreased, the mechanical strength can be increased. Therefore, the ratio of zeolite included in the zeolite structure can be raised, and the zeolite structure has an excellent purification performance.

Moreover, the zeolite particles having large particle diameters have a high heat resistance. On the other hand, the zeolite particles having small particle diameters have an excellent purification performance. Therefore, when the fine zeolite particles and the coarse zeolite particles are mixed at a predetermined ratio and used, both the heat resistance and the purification performance can be enhanced.

In the zeolite structure of the present embodiment, for example, as the powder made of the plurality of zeolite particles as aggregates, there is used mixed powder including powder of the fine zeolite particles having a small average particle diameter and powder of coarse zeolite particles which have an average particle diameter of three or more times the average particle diameter of the fine zeolite particles and which are not an agglomerated material of primary particles. That is, the powder of the particles for use as the zeolite particles as aggregates is powder which exhibits a bimodal particle size distribution having a first peak due to the fine zeolite particles having small particle diameters and a second peak due to the coarse zeolite particles having the average particle diameter which is three or more times the average particle diameter of the fine zeolite particles.

It is to be noted that "the average particle diameter" in the present embodiment is a median diameter (d50) in the distribution of the particle diameters of solid particles (zeolite particles) of a zeolite powder material.

Moreover, the volume ratio of the coarse zeolite particles with respect to the whole volume of the plurality of zeolite particles can be calculated from, for example, a fine structure photograph of a section of the zeolite structure cut along a predetermined portion. More specifically, in a calculation method of the above volume ratio, for example, the zeolite structure is first cut, a cut section of the structure is polished, and then the polished cut surface is photographed with a scanning type electron microscope or the like. It is to be noted that when the image of a fine structure of the section is photographed, a field of view preferably includes 10 to 30 coarse zeolite particles.

As to the obtained scanning type electron microscope photograph (hereinafter referred to as "the SEM photograph" sometimes), particle diameters of the zeolite particles are measured by using image analysis software (e.g., "Image-Pro Plus (trade name)" manufactured by MEDIA CYBERNETICS Co.), and the zeolite particles having the measured particle diameters are classified into fine zeolite particles and coarse zeolite particles. It is to be noted that during the measurement of the particle diameters by the above image analysis software, the diameters of round particles can be measured as the particle diameters of the particles. Moreover, when the particle diameters of the zeolite particles are measured, an average value of the diameters in at least ten fields of view (i.e., corresponding to ten SEM photographs) is obtained.

Furthermore, the volumes of the zeolite particles are calculated from sizes of the photographed zeolite particles. Therefore, in the present description, "the whole volume of the zeolite particles" means the total value of the volumes of the zeolite particles, i.e., the volume which does not include gaps (voids) among the zeolite particles. Such a whole volume of the zeolite particles is, for example, a value obtained by dividing the whole mass of the zeolite particles by a density thereof in the case of powder of particles for use as a raw material.

It is to be noted that examples of a method of classifying the zeolite particles having the measured particle diameters into the fine zeolite particles and the coarse zeolite particles to calculate the volumes of the coarse zeolite particles include a method of separating two peaks (i.e., particle size distributions of the respective particles) due to the respective particles (i.e., fine particles and coarse particles) from a bimodal particle size distribution acquired by the above image analysis software. It is to be noted that when the two peaks due to the fine particles and the coarse particles are separated, it is preferably supposed that each of the fine zeolite particles and the coarse zeolite particles is the powder of the particles indicating a normal distribution, and the particle size distribution is preferably a graph having the abscissa which indicates the logarithms of the particle diameters. The volumes of the coarse zeolite particles are calculated in this manner, whereby the volumes of the coarse zeolite particles can more correctly be calculated. Moreover, when the particle size distributions of the respective particles (the fine zeolite particles and the coarse zeolite particles) are separated, the average particle diameters of the fine zeolite particles and the coarse zeolite particles can be obtained from the obtained particle size distributions.

As described above, the ratio of the volumes of the coarse zeolite particles with respect to the whole volume of the plurality of zeolite particles (hereinafter also referred to as "the volume ratio of the coarse zeolite particles") is calculated from the above SEM photograph. However, when the volumes of the coarse zeolite particles and the volumes of the fine zeolite particles to be used in a raw material stage (i.e., a manufacturing stage) are beforehand known, or when the volume of each particle can be measured in the manufacturing stage, the above volume ratio of the coarse zeolite particles may be measured from the volume of each particle in this raw material stage. When the volume ratio of the coarse zeolite particles is obtained by such a method, the volume ratio of the coarse zeolite particles can remarkably easily be obtained. It is to be noted that when the above volume ratio of the zeolite particles is obtained in the raw material stage, the average particle diameters of the fine zeolite particles and the coarse zeolite particles are values measured by a laser diffraction scattering process in conformity to JIS R1629. For example, the average particle diameter of the zeolite particles can be measured with a laser diffraction/scattering type particle size distribution measuring device: "LA-920 (trade name)" manufactured by Horiba, Ltd.

Moreover, the ratio of the volume of the above inorganic binding material (also referred to as the volume ratio of the inorganic binding material) is the ratio of the volume in the zeolite structure (i.e., a fired article obtained by firing the extrusion-formed article of the zeolite raw material). That is, the inorganic binding material is used in a liquid or solid state as a raw material sometimes, but the above volume ratio of the inorganic binding material is the ratio of the volume in a solid content excluding a liquid component. The ratio of the volume of the inorganic binding material can be calculated from, for example, the SEM photograph from which the above "volume ratio of the coarse zeolite particles" has been calculated. That is, the particle diameters or occupied areas of the zeolite particles and the occupied area of the inorganic binding material are obtained from the above SEM photograph by use of the image analysis software (e.g., "Image-ProPlus (trade name)" manufactured by MEDIA CYBERNETICS Co.), and from these values, the whole volume of the zeolite particles and the volume of the inorganic binding material can be calculated. It is to be noted that a method of calculating the volumes of the zeolite particles from the measured diameters of the zeolite particles can be performed in conformity to the calculation method of "the volume ratio of the coarse zeolite particles". As to the calculation of "the volume ratio of the inorganic binding material", an average value in at least ten fields of view (i.e., corresponding to ten SEM photographs) is obtained.

The ratio of the volume of the inorganic binding material can be represented by the following equation (1).

Ratio of volume of inorganic binding material={(volume of inorganic binding material)/(whole volume of zeolite particles+volume of inorganic binding material)} (1)

Moreover, when the masses of the zeolite particles (i.e., the total mass of the coarse particles and fine particles) and the mass of the inorganic binding material which are used in the raw material stage (i.e., the manufacturing stage) are beforehand known, or when the volume of each raw material component can be measured in the manufacturing stage, the volume ratio of the inorganic binding material may be calculated in the raw material stage. When the volume ratio of the inorganic binding material is obtained by such a method, the volume ratio of the inorganic binding material can remarkably easily be obtained. Hereinafter, a method of calculating the volume ratio of the inorganic binding material in the raw material stage will be described.

The volume of the inorganic binding material can be calculated by the following equation (2), and the whole volume of the zeolite particles can be calculated by the following equation (3).

Volume of inorganic binding material={(mass of inorganic binding material before fired)×(mass change ratio of inorganic binding material by firing and drying)}/(density of fired inorganic binding material). (2)

Whole volume of zeolite particles=whole mass of zeolite particles/density of zeolite (3)

It is to be noted that in the above equation (3), the density of zeolite is the density of zeolite constituting the zeolite particles, and is set to 1.85 g/cm$^3$. Moreover, the mass change ratio of the inorganic binding material by firing and drying means the value of the ratio of the mass which changes owing to the firing and drying with respect to the mass of the inorganic binding material before fired. It is to be noted that the density of the fired inorganic binding material and the mass which changes owing to the firing and drying can be obtained by firing the only inorganic binding material which is used during manufacturing and measuring the masses thereof before and after the firing.

Furthermore, "the particles are not the agglomerated material of the primary particles" means that the particles are not secondary particles, i.e., a plurality of particles having small particle diameters and agglomerated as one group by mutual van der Waals' forces, but the particles are independent particles, i.e., one crystal structure.

It is to be noted that when the average particle diameter of the coarse zeolite particles is a size which is less than three times the average particle diameter of the fine zeolite particles, depending on the content ratio of the coarse zeolite particles, the fine zeolite particles are not sufficiently charged among the coarse zeolite particles, and the mechanical strength of the zeolite structure cannot improve. That is, in the zeolite structure of the present embodiment, the fine zeolite particles are appropriately charged among the coarse zeolite particles, and a porosity of the zeolite structure lowers. In consequence, the mechanical strength, for example, a bending strength improves.

The average particle diameter of the coarse zeolite particles is preferably from 3 to 1000 times, further preferably from 7 to 100 times and especially preferably from 15 to 30 times the average particle diameter of the fine zeolite particles. According to such a constitution, the fine zeolite particles are more optimally charged among the coarse zeolite particles, and the mechanical strength can further improve. It is to be noted that if the average particle diameter of the coarse zeolite particles is larger than 1000 times, the coarse zeolite particles become excessively large, and it becomes difficult to extrude the particles sometimes.

In the zeolite structure of the present embodiment, the volume ratio of the coarse zeolite particles with respect to the whole volume of the zeolite particles needs to be from 40 to 90 vol %. If the above volume ratio of the coarse zeolite particles is less than 40 vol %, the number of the coarse zeolite particles becomes excessively small, gaps into which the fine zeolite particles are charged cannot be made, and the strength cannot improve. On the other hand, if the volume ratio exceeds 90 vol %, the number of the fine zeolite particles charged into the gap is excessively small, and the strength of these particles cannot improve. It is to be noted that the volume ratio of the coarse zeolite particles is the ratio in the coarse zeolite particles having the above predetermined size (i.e., three or more times the average particle diameter). When the average particle diameter of the coarse zeolite particles and the volume ratio of the coarse zeolite particles satisfy the above numeric value ranges, these conditions can cooperatively produce the above-mentioned effects. That is, even if the average particle diameter of the coarse zeolite particles is three or more times the average particle diameter of the fine zeolite particles, the above ratio is not satisfied. Moreover, when the above ratio is satisfied but the average particle diameter of the coarse zeolite particles is small, the mechanical strength cannot sufficiently improve.

Moreover, in the zeolite structure of the present embodiment, the volume ratio of the inorganic binding material needs to be from 5 to 50 vol %. It is to be noted that if the volume ratio of the inorganic binding material is less than 5 vol %, the amount of the binding material is excessively small, and the zeolite particles cannot satisfactorily bind. On the other hand, if the volume ratio of the inorganic binding material exceeds 50 vol %, the amount of the inorganic binding material becomes excessively large, whereby purification performance deteriorates.

It is to be noted that in the present description, the zeolite raw material means a forming raw material which contains at least zeolite particles and inorganic binding material and which is used to obtain a formed article for forming the zeolite structure by extrusion. Moreover, the zeolite material means a material of the zeolite structure manufactured by drying and firing the formed article obtained by extruding the zeolite raw material, i.e., the material of a sintered article.

(1-1) Zeolite Particles:

The zeolite particles become aggregates of the zeolite structure of the present embodiment. As to such zeolite particle, the inorganic binding material binds a plurality of zeolite particles to one another, thereby forming one structure.

The zeolite particles for use in the zeolite structure of the present embodiment are constituted of a plurality of particles comprising the fine zeolite particles having a small average particle diameter and coarse zeolite particles which have a size of three or more times the average particle diameter of the fine zeolite particles and which are not the agglomerated material of the primary particles. Moreover, the volume ratio of the coarse zeolite particles with respect to the whole volume of the plurality of zeolite particles is from 4.0 to 90 vol %. It is to be noted that the whole volume of the plurality of zeolite particles means the total value of the volumes of all the zeolite particles used in the zeolite structure.

It is to be noted that as to the powder of such zeolite particles (the agglomerate of the plurality of zeolite particles), there is not any special restriction on the type of zeolite or the like, as long as the powder is mixed powder which satisfies the above average particle diameter and the volume ratio of the contained coarse zeolite particles. However, the powder preferably contains particles made of at least one type of zeolite selected from the group consisting of ZSM-5 type zeolite, β-type zeolite, Y-type zeolite, mordenite type zeolite and ferrierite type zeolite. Among them, ZSM-5 type zeolite and β-type zeolite are preferable, because such type of zeolite has satisfactory purification performance and adsorption performance.

Moreover, there is not any special restriction on the average particle diameter of the fine zeolite particles, but the average particle diameter is preferably from 0.1 to 30 μm, further preferably from 0.3 to 5 μm and especially preferably from 0.5 to 2 μm. It is to be noted that if the average particle diameter of the fine zeolite particles is less than 0.1 μm, heat resistance lowers sometimes. If the average particle diameter exceeds 30 μm, it may become difficult to extrude the zeolite raw material.

Furthermore, the fine zeolite particles may be an agglomerated material of the zeolite particles including, as at least a part thereof, a plurality of agglomerated fine zeolite particles. That is, also in a case where the fine zeolite particles are constituted of an agglomerated material (secondary particles) including the fine zeolite particles as the primary particles, an effect can be obtained in the same manner as in a case where the particles are constituted of the fine zeolite particles singularly.

That is, when the fine zeolite particles are the agglomerated material, the average particle diameter of the coarse zeolite particles needs to have a size which is three or more times the average particle diameter of the agglomerated material of the fine zeolite particles.

It is to be noted that the average particle diameter of the agglomerated material of the zeolite particles is preferably from 0.1 to 30 μm, further preferably from 0.3 to 5 μm and especially preferably from 0.5 to 2 μm. It is to be noted that if the average particle diameter of the agglomerated material of the zeolite particles is less than 0.1 μm, the heat resistance lowers sometimes. If the average particle diameter exceeds 30 μm, it may become difficult to extrude the material. It is to be noted that the average particle diameter of the agglomerated material is a value measured by a laser diffraction scattering process in conformity to JIS R1629.

Moreover, the average particle diameter of the coarse zeolite particles is preferably from 0.5 to 100 μm, further preferably from 5 to 50 μm and especially preferably from 10 to 20 μm. It is to be noted that if the average particle diameter of the coarse zeolite particles is less than 0.5 μm, the heat resistance lowers sometimes. If the average particle diameter exceeds 100 μm, it may become difficult to extrude the particles.

It is to be noted that during the preparation of the zeolite structure of the present embodiment, when the powder of the fine zeolite particles and the powder of the coarse zeolite particles are used, each powder preferably has a large maximum frequency, when the particle size distribution of the powder is represented by a frequency distribution. The maximum frequency is preferably 7% or more, further preferably 13% or more and especially preferably 20% or more. According to such a constitution, a difference between the fine zeolite particles and the coarse zeolite particles becomes clear, the fine zeolite particles are appropriately charged among the coarse zeolite particles, and the porosity of the structure lowers. In consequence, the mechanical strength, for example, the bending strength improves.

It is to be noted that "the frequency distribution" can be a graph in which the abscissa indicates the particle diameters of the powder constituted of a plurality of particles, and the ordinate indicates the frequency (%) of the particle size distribution (a volume reference distribution). Moreover, "the maximum frequency" means a frequency (the maximal value of the distribution) at which the frequency (%) is maximized in a frequency distribution curve. It is to be noted that when the volume ratio of the coarse zeolite particles is calculated, the above maximum frequency can be obtained from the particle size distributions of the fine zeolite particles and the coarse zeolite particles acquired by image analysis of an SEM photograph, (i.e., the particle size distribution from which the bimodal particle size distribution has been separated).

Moreover, the zeolite structure of the present embodiment is preferably made of zeolite (the zeolite particles) subjected to ion exchange between cations of zeolite and metal ions. Such zeolite subjected to the ion exchange between cations of zeolite and the metal ions has an excellent catalyst function, and a treatment such as removal of nitrogen oxides (NOx) from an exhaust gas can satisfactorily be performed.

Specifically, the zeolite particles of at least a part of the plurality of zeolite particles are preferably particles made of zeolite subjected to ion exchange between cations of zeolite and ions of at least one type of metal selected from the group consisting of copper, iron, nickel, zinc, manganese, cobalt, silver, palladium, indium, cerium, gallium, titanium and vanadium. For example, ion exchange between cations of zeolite and the iron ions or copper ions can obtain a satisfactory NOx gas purification performance, and ion exchange between cations of zeolite and the copper ions or silver ions can develop a satisfactory hydrocarbon adsorption ability.

It is to be noted that there is not any special restriction on an ion exchange amount between cations of zeolite and the metal ions (M+/Al ion molar ratio), but the ion exchange amount is preferably from 0.3 to 2.0, further preferably from 0.7 to 1.5 and especially preferably from 0.9 to 1.2. It is to be noted that the ion exchange amount can be measured with, for example, an inductively coupled plasma mass analysis device: "SPQ9000 (trade name)" manufactured by Seiko Instruments, Inc. It is to be noted that the above ion exchange amount is a molar ratio ("M+/Al ions") of a metal ion valence (M+) with respect to aluminum ions (Al ions) in zeolite. It is to be noted that if the ion exchange amount is small (e.g., less than 0.3), a catalyst performance lowers. On the other hand, if the ion exchange amount is excessively large (e.g., exceeding 2.0), the catalyst performance is saturated, and the effect due to the ion exchange is not easily developed sometimes. It is to be noted that the ion exchange amount can be represented by the ratio (mass %) of the mass of the metal ions with respect to the mass of the zeolite particles subjected to the exchange.

It is to be noted that when the zeolite particles are subjected to the ion exchange, zeolite having a powder material state before binding with the binding material may be subjected to the ion exchange, or zeolite having a zeolite structure state after binding with the binding material may be subjected to the ion exchange. It is to be noted that because of simpler manufacturing steps, zeolite having the powder material state is more preferably subjected to the ion exchange (i.e., zeolite having a raw material state and beforehand subjected to the ion exchange).

The fine zeolite particles and the coarse zeolite particles may be particles made of the same zeolite or particles made of different types of zeolite. Moreover, the fine zeolite particles or the coarse zeolite particles may be mixed particles of a plurality of types of zeolite particles. For example, in the case of mixed powder of two types of fine zeolite particles and one type of coarse zeolite particles, the coarse zeolite particles need to have an average particle diameter which is three or more times the average particle diameter of each of the two types of fine zeolite particles. In consequence, the plurality of zeolite particles may be constituted of three or more types of particles.

Moreover, in the zeolite structure of the present embodiment, the fine zeolite particles and coarse zeolite particles constituting the plurality of zeolite particles may be particles made of zeolite subjected to ion exchange between cations of zeolite and different metal ions. It is known that, for example, height of reactivity with respect to purification of the NOx gas, or durability such as resistance to high-temperature water vapor varies with the type of the metal ions for the ion exchange. Specifically, for example, the copper ions have a high reactivity, but have a comparatively low durability. On the other hand, the iron ions have a slightly low reactivity and a high durability as characteristics.

In the zeolite structure of the present embodiment, as shown in FIG. 2, the fine zeolite particles 32a are arranged to cover peripheries of the coarse zeolite particles 32b, and hence the fine zeolite particles 32a are easily exposed to water vapor, and easily come in contact with a component as a purification target, for example, the NOx gas. On the other hand, a number of fine zeolite particles 32a are arranged on the surfaces of the coarse zeolite particles 32b, and hence the coarse zeolite particles do not easily come in contact with the water vapor or the NOx gas.

Therefore, for example, the coarse zeolite particles which do not easily come in contact with the water vapor are subjected to the ion exchange between the cations of particles and the copper ions, whereby the particles have the high reactivity while compensating for the low durability. Therefore, even when the frequency of the contact between the particles and the NOx gas is low, a sufficient purification performance can be developed. On the other hand, the fine zeolite particles which are easily exposed to the water vapor are subjected to the ion exchange between cations of the particles and the iron ions, whereby the excellent durability can satisfactorily be utilized. Moreover, the particles have a slightly low reactivity, but the frequency of the contact between the particles and the NOx gas is high. Therefore, a sufficient purification performance can be developed.

It is to be noted that a combination of the metal ions is not limited to the above combination of the copper ions and the iron ions, and can appropriately be selected in accordance with the characteristics (e.g., the durability and the reactivity) of the respective metal ions. It is to be noted that metal ions having a high durability are preferably used in ion exchange between the cations of fine zeolite particles and the ions, and metal ions having a high reactivity are preferably used in ion exchange between the cations of coarse zeolite particles and the ions. For example, the fine zeolite particles are particles made of zeolite subjected to ion exchange between cations of zeolite and ions of at least one type of metal selected from the group consisting of iron, titanium and cobalt, and the coarse zeolite particles are particles made of zeolite subjected to ion exchange between cations of zeolite and ions of at least one type of metal selected from the group consisting of copper, manganese, silver, and vanadium. This case can be a preferable example. It is to be noted that an effect in a case where the respective zeolite particles are subjected to the ion exchange between the cations of particles and separate metal ions is especially remarkable in a case where the zeolite structure has a shape with a large surface area as in a honeycomb shape or the like described later.

It is to be noted that, for example, WO2009/141886A1 discloses a honeycomb structure including two types of zeolite subjected to ion exchange between cations of zeolite and different types of metal ions. However, in this honeycomb structure, the average particle diameters of the respective types of zeolite subjected to the ion exchange between cations of zeolite and different types of metal ions are not especially determined. The honeycomb structure does not produce any remarkable effect obtained by selecting the metal ions in consideration of characteristics (e.g., the durability and reactivity) of the respective metal ions and characteristics (e.g., contact efficiency between the particles and the gas or water vapor) of the fine and coarse zeolite particles.

Moreover, the honeycomb structure of WO2009/141886A1 described above is manufactured, for example, by using zeolite subjected to ion exchange between cations of zeolite and one type of metal ions to prepare the honeycomb structure, and then forming a coat layer including zeolite subjected to the ion exchange between cations of zeolite and the other type of metal ions on partition wall surfaces of the prepared honeycomb structure. Two types of zeolite subjected to the ion exchange between cations of zeolite and different types of metal ions have different arrangement regions, respectively. On the other hand, the zeolite structure of the present embodiment is formed by beforehand subjecting the fine zeolite particles and coarse zeolite particles to ion exchange between the cations of particles and separate metal ions and extruding the zeolite raw material including the respective particles. In one structure, the fine zeolite particles and the coarse zeolite particles are present in a mixed state. Moreover, a formed article can be obtained by one extrusion forming step as described above, whereby the manufacturing method of the structure is remarkably simple as compared with the honeycomb structure disclosed in WO2009/141886A1 described above.

(1-2) Inorganic Binding Material:

The inorganic binding material is a binding material for binding the above-mentioned zeolite particles to one another.

As such an inorganic binding material, there can preferably be used the inorganic binding material including at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

Moreover, the volume ratio of the inorganic binding material with respect to the whole zeolite material, i.e., the whole zeolite structure is from 5 to 50 vol %, preferably from 10 to 30 vol %, and further preferably from 15 to 25 vol %. When the volume ratio of the inorganic binding material is less than 5 vol %, it may be difficult to satisfactorily bind the zeolite particles. On the other hand, when the volume ratio of the inorganic binding material exceeds 50 vol %, the purification performance deteriorates sometimes.

(1-3) Zeolite Structure:

The zeolite structure of the present embodiment is formed by extruding a zeolite raw material containing zeolite particles and the inorganic binding material as described above, and is a porous material formed by binding the plurality of zeolite particles with the inorganic binding material.

It is to be noted that the porosity and pore diameters (fine pore diameters) of the zeolite structure of the present embodiment need to be considered from two viewpoints. In the first viewpoint, zeolite (the zeolite particles) is a substance having fine pores as a crystal structure. Therefore, the first viewpoint relates to fine pores having a value inherent in the type of zeolite. The value is determined, when the type of zeolite is determined. For example, ZSM-5 type zeolite has fine pores of oxygen ten-membered rings, and fine pore diameters are from about 0.5 to 0.6 nm. Moreover, β-type zeolite has fine pores of oxygen twelve-membered rings, and fine pore diameters are from about 0.5 to 0.75 nm. In the second viewpoint, the zeolite structure includes the zeolite particles (zeolite crystal particles) integrated with the binding material, and hence the second viewpoint relates to the porosity and pore diameters of the zeolite structure (the porous material). It is to be noted that in the crystal structure, the fine pores and fine pore diameters are mentioned, and in the porous material, the pores and pore diameters are mentioned. In the zeolite structure of the present embodiment, the porosity is preferably from 20 to 60%, further preferably from 30 to 50%, and especially preferably from 30 to 40%. When the porosity is excessively low, the purification performance lowers sometimes. On the other hand, when the porosity is excessively high, strength lowers sometimes. It is to be noted that the porosity is a value calculated in the following equation (4) by use of a pore capacity per unit mass of pores having pore diameters of 3 nm to 180 µm measured by mercury porosimetry, and true density of the zeolite structure.

$$\text{Porosity} = \text{pore capacity}/(\text{pore capacity} + 1/\text{true density of zeolite structure}) \times 100 \quad (4)$$

It is to be noted that in the above equation (4), the pore capacity is a value measured with a fully automatic multifunctional mercury porosimeter "PoreMaster 60GT (trade name)" manufactured by Quantachrome Co. Moreover, as to the true density of the zeolite structure, the true density of zeolite (the zeolite particles) is set to 1.85 g/cm$^3$, and the true density of the inorganic binding material is measured with a dry type automatic densimeter "Accupyc 1330 (trade name)" manufactured by Micromeritics, Inc.

Figure 3:
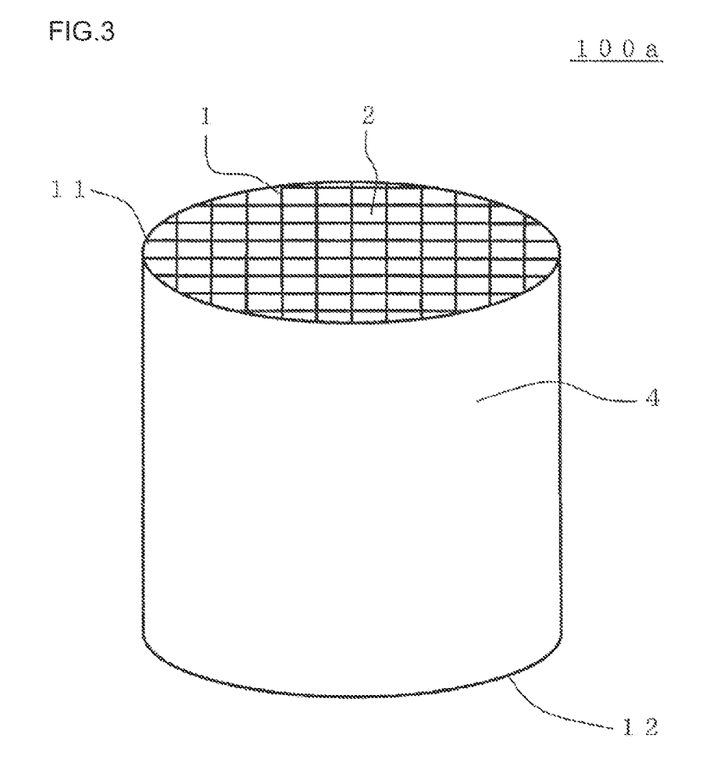
FIG. 3 is a perspective view schematically showing another embodiment of the zeolite structure of the present invention.

There is not any special restriction on the shape of the zeolite structure, as long as the structure is formed by extrusion. For example, the zeolite structure can be utilized for gas purification or separation. For example, the zeolite structure may have a shape such as a film-like shape, a plate-like shape (e.g., see FIG. 1) or a tubular shape. As shown in FIG. 3, the zeolite structure may be formed in a honeycomb shape including partition walls 1 disposed to form a plurality of cells 2 which become through channels of a fluid and which extend from one end face 11 to the other end face 12 (a zeolite structure 100a). Here, FIG. 3 is a perspective view schematically showing another embodiment of the zeolite structure of the present invention.

According to such a honeycomb shape, it is possible to form, by the zeolite structure, a honeycomb structure for purifying an exhaust gas discharged from an engine for a car, an engine for a construction machine, an industrial stational engine, a burning apparatus or the like and containing NOx or the like, or for adsorbing hydrocarbons or the like. That is, it is not necessary to use a ceramic carrier of cordierite or the like, which has heretofore been used. Therefore, as compared with a case where the ceramic carrier is used, a pressure loss can remarkably be low. Therefore, more catalysts can be loaded on the zeolite structure. Moreover, the zeolite structure of the present embodiment has a remarkably high strength. Therefore, even when the zeolite structure is installed and used in an exhaust system of a car, breakdown or deformation due to vibration or the like does not easily occur.

Moreover, when the zeolite structure is formed in the honeycomb shape, an area of a section which is perpendicular to an extending direction of the cells 2 is preferably from 300 to 200000 mm$^2$. When the area is smaller than 300 mm$^2$, an area where the exhaust gas can be treated becomes small sometimes. Additionally, the pressure loss increases sometimes. When the area is larger than 200000 mm$^2$, the strength of the zeolite structure lowers sometimes.

Furthermore, as shown in FIG. 3, the zeolite structure 100a of the present embodiment preferably comprises an outer peripheral wall 4 disposed to surround the whole outer periphery of the partition walls 1. The material of the outer peripheral wall does not necessarily have to be the same material as that of the partition walls. However, if the material of an outer peripheral portion is noticeably different in viewpoints of physical properties such as heat resistance and thermal expansion coefficient, a problem of breakdown of the partition walls or the like occurs sometimes. Therefore, the outer peripheral wall and the partition walls mainly preferably include the same material or contain a material having the equivalent physical properties. The outer peripheral wall may be formed integrally with the partition walls by extrusion, or the outer peripheral portion of a formed article may be processed in a desirable shape and coated with the outer peripheral wall.

In the zeolite structure having the honeycomb shape, there is not any special restriction on the shape of each cell (i.e., the shape of the section of the cell which is perpendicular to a cell extending direction), and examples of the shape include a triangular shape, a quadrangular shape, a hexagonal shape, an octagonal shape, a round shape, or a combination of these shapes.

The thicknesses of the partition walls in the zeolite structure having the honeycomb shape are preferably from 50 µm to 2 mm, and further preferably from 100 µm to 350 µm. If the thicknesses are smaller than 50 µm, the strength of the zeolite structure lowers sometimes. If the thicknesses are larger than 2 mm, the purification performance lowers sometimes, or the pressure loss increases sometimes when the gas passes through the zeolite structure. Moreover, the thickness of the outer peripheral wall 4 of the outermost periphery of the zeolite structure having the honeycomb shape is preferably 10 mm or less. If the thickness is larger than 10 mm, an area to perform an exhaust gas purification treatment may become small.

Moreover, there is not any special restriction on the cell density of the zeolite structure having the honeycomb shape, but the cell density is preferably from 7.8 to 155.0 cells/cm$^2$, and further preferably from 31.0 to 93.0 cells/cm$^2$. If the cell density is larger than 155.0 cells/cm$^2$, the pressure loss increases sometimes when the gas passes through the zeolite structure. If the cell density is smaller than 7.8 cells/cm$^2$, the area to perform the exhaust gas purification treatment becomes small sometimes.

There is not any special restriction on the whole shape of the zeolite structure having the honeycomb shape, and examples of the shape include a cylindrical shape, an oval shape or another desirable shape. As to the size of the zeolite structure, when the zeolite structure has, for example, a cylindrical shape, the diameter of the bottom surface of the structure is preferably from 20 to 500 mm, and further preferably from 70 to 300 mm. Moreover, the length of the zeolite structure in a central axis direction is preferably from 10 to 500 mm, and further preferably from 30 to 300 mm.

(2) Manufacturing Method of Zeolite Structure:

Next, one embodiment of a manufacturing method of the zeolite structure of the present invention will be described. The embodiment of the manufacturing method of the zeolite structure of the present invention manufactures one embodiment of the above zeolite structure of the present invention.

The manufacturing method of the zeolite structure of the present embodiment comprises a step of mixing powder including a plurality of zeolite particles obtained by mixing fine zeolite particles having a small average particle diameter and coarse zeolite particles having an average particle diameter which is three or more times the average particle diameter of the fine zeolite particles, an inorganic binding material which binds the plurality of zeolite particles, and an organic binder, to prepare a zeolite raw material; a step of extruding the obtained zeolite raw material to form a formed zeolite article; and a step of firing the obtained formed zeolite article to prepare the zeolite structure. The step of preparing the zeolite raw material includes the steps of using, as the plurality of zeolite particles, powder of the zeolite particles containing 40 to 90 vol % of the coarse zeolite particles with respect to the whole volume of the plurality of zeolite particles, and adding 5 to 50 vol % of the inorganic binding material to the total volume of 100 vol % of the plurality of zeolite particles and the inorganic binding material in terms of a solid content, to prepare the zeolite raw material.

According to such a constitution, the zeolite structure of the present embodiment described above can simply and inexpensively be manufactured. It is to be noted that there is not any special restriction on the shape of the formed zeolite article obtained by the extrusion, and the shape may be a plate-like shape of the zeolite structure 100 shown in FIG. 1, or a honeycomb shape of the zeolite structure 100a shown in FIG. 3.

Hereinafter, the manufacturing method of the zeolite structure of the present embodiment will be described in more detail.

First, in the manufacturing method of the zeolite structure of the present embodiment, as the powder of the zeolite particles, fine-particle zeolite powder constituted of fine zeolite particles having comparatively small particle diameters and coarse-particle zeolite powder constituted of coarse zeolite particles having an average particle diameter which is three or more times the average particle diameter of the fine zeolite particles are mixed at a predetermined ratio, to prepare mixed powder of two types of powder having different average particle diameters. It is to be noted that the above average particle diameter is a median diameter (d50) in a distribution of particle diameters of solid particles constituting a zeolite powder material (the zeolite particles), and is a value measured by a laser diffraction scattering process in conformity to JIS R1629. This average particle diameter can be measured with, for example, a laser diffraction/scattering type particle size distribution measuring device: "LA-920 (trade name)" manufactured by Horiba, Ltd.

It is to be noted that the average particle diameter of the coarse zeolite particles is the average particle diameter of a crystal structure which is not the agglomerated material of the primary particles. Moreover, the coarse zeolite particles need to be particles which are not further agglomerated (the primary particles). On the other hand, the fine zeolite particles may be secondary particles of a plurality of agglomerated zeolite particles, or primary particles of zeolite particles which are not agglomerated.

The volume of the coarse zeolite particles needs to be from 40 to 90 vol %, preferably from 50 to 80 vol %, and further preferably from 60 to 70 vol % with respect to the whole volume of a plurality of zeolite particles constituting zeolite powder. It is to be noted that the fine zeolite particles are contained at a ratio of 10 to 60 vol % with respect to the whole volume of the plurality of zeolite particles.

Moreover, the volume ratio of the inorganic binding material to be added is from 5 to 50 vol %, preferably from 10 to 30 vol %, and further preferably from 15 to 25 vol % with respect to the total volume of 100 vol % of the plurality of zeolite particles (the zeolite powder) and the inorganic binding material in terms of a solid content. It is to be noted that the volume of the inorganic binding material in terms of the solid content can be calculated from the mass of the inorganic binding material in terms of the solid content and the density thereof. That is, the volume can be calculated by the above equations (2) to (4).

Moreover, as the zeolite particles, there can be used particles made of at least one type of zeolite selected from the group consisting of ZSM-5 type zeolite, β-type zeolite, Y-type zeolite, mordenite type zeolite and ferrierite type zeolite. It is to be noted that the average particle diameters of the respective types of zeolite particles or the like are preferably similar to those described in the embodiment of the zeolite structure.

Moreover, the zeolite particles may be subjected to an ion exchange treatment by the metal ions. When such zeolite particles are used, a zeolite structure having an excellent catalyst function can easily be manufactured. It is to be noted that the ion exchange treatment can be performed after manufacturing the zeolite structure. Moreover, in the fine zeolite particles and the coarse zeolite particles, the type of the metal ions for the ion exchange may be changed, to perform the ion exchange treatment.

It is to be noted that a method of subjecting the zeolite particles or the zeolite structure to the ion exchange treatment by use of the metal ions can be performed as follows.

A solution for ion exchange containing metal ions for the ion exchange (the solution containing the metal ions) is prepared. For example, when the ion exchange is performed by using silver ions, an aqueous solution of silver nitrate or silver acetate is prepared. Moreover, when the ion exchange is performed by using copper ions, an aqueous solution of copper acetate, copper sulfate or copper nitrate is prepared. Furthermore, when the ion exchange is performed by using iron ions, an aqueous solution of iron sulfate or iron acetate is prepared. The concentration of the solution for ion exchange is preferably from 0.005 to 0.5 (mol/liter). Moreover, the zeolite particles are immersed in the solution for ion exchange. Immersion time can appropriately be determined in accordance with the amount of the metal ions for the ion exchange or the like. Furthermore, when the zeolite particles are taken out of the solution for ion exchange, dried and calcinated, the zeolite particles subjected to the ion exchange can be obtained. Drying conditions are preferably from 80 to 150° C. and from one to ten hours. Calcinating conditions are preferably from 400 to 600° C. and from one to ten hours.

Next, the inorganic binding material is further added to the powder of the mixed zeolite particles to prepare the zeolite raw material (i.e., the forming raw material). The inorganic binding material preferably includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

The zeolite raw material preferably contains water. The content of water in the zeolite raw material is preferably from 30 to 70 mass % with respect to 100 mass % of zeolite particles.

Moreover, the zeolite raw material contains an organic binder. Examples of the organic binder include methylcellulose, hydroxypropyl methylcellulose, hydroxypropyl ethyl cellulose, hydroxyethyl cellulose, carboxymethylcellulose, and polyvinyl alcohol.

It is to be noted that the amount of the organic binder to be added is preferably from 1 to 20 mass %, further preferably from 3 to 10 mass %, and especially preferably from 3 to 6 mass % with respect to the total mass of the zeolite particles and the inorganic binding material. If the amount of the organic binder to be added is excessively small (less than 1 mass %), it may become remarkably difficult to perform extrusion forming. If the amount of the organic binder to be added is excessively large (exceeding 20 mass %), the porosity of the obtained zeolite structure becomes high, and strength lowers sometimes.

Moreover, the zeolite raw material may further contain a dispersant or the like. Examples of the dispersant include fatty acid, acrylic acid, sorbitan acid, and polyalcohol.

There is not any special restriction on a method of mixing the zeolite powder and the inorganic binding material, and a known method can be employed. Examples of the method include a method of mixing the zeolite powder and the inorganic binding material by using a twin arm type kneader manufactured by Honda Machinery Works Co., Ltd. in a dry system (i.e., without adding any water) for 10 to 30 minutes, further adding water to the mixed material, and mixing and kneading the mixed material for 20 to 60 minutes while regulating viscosity of the mixed material.

Next, the obtained zeolite raw material is formed in a predetermined shape by extrusion, to form a formed zeolite article. It is to be noted that when the formed zeolite article is formed in a honeycomb shape, for example, first the zeolite raw material is preferably kneaded to obtain a columnar formed article, and the columnar formed article is formed as a formed zeolite article having a honeycomb shape by extrusion. There is not any special restriction on a method of kneading a forming raw material to obtain the columnar formed article, and examples of the method include methods using a kneader, a vacuum clay kneader and the like. During the extrusion forming, it is preferable to use a die having the desirable whole shape, cell shape, partition wall thickness, cell density and the like. As a material of the die, a metal which is not easily worn is preferable.

The obtained formed article having the honeycomb shape is preferably dried before fired. There is not any special restriction on a drying method, and examples of the method include electromagnetic heating systems such as microwave heating drying and high frequency inductive heating drying, and external heating systems such as hot air drying and superheated steam drying. Among these methods, there is a method of drying the whole article to remove a predetermined amount of water by the electromagnetic heating system and then drying the article to remove the remaining water by the external heating system, and this method is preferable in that the whole formed article can quickly and uniformly be dried so as to prevent cracks from being generated.

Moreover, before firing (finally firing) the formed zeolite article, the formed zeolite article is preferably calcinated. The article is calcinated to degrease the article. There is not any special restriction on this method, as long as contained organic substances (the organic binder, the dispersant, etc.) can be removed. As calcinating conditions, the article is preferably heated at about 200 to 500° C. in an oxidizing atmosphere for about one to 20 hours.

Next, the formed zeolite article is fired to obtain a zeolite structure having a predetermined shape. Therefore, "the formed and fired zeolite article" is "the zeolite structure". There is not any special restriction on a firing method, and the article can be fired by using an electric furnace, a gas furnace or the like. It is to be noted that a firing temperature is preferably from 500 to 750° C. and further preferably from 550 to 700° C. When the firing temperature is excessively low, strength lowers sometimes. When the firing temperature is excessively high, the performance of zeolite lowers sometimes. Moreover, as firing conditions at the above temperature during the firing, the article is preferably heated in atmospheric air for one to ten hours.

As described above, it is possible to manufacture the zeolite structure constituted of the zeolite material containing a plurality of zeolite particles including the fine zeolite particles having a small average particle diameter and the coarse zeolite particles which have an average particle diameter three or more times the average particle diameter of the fine zeolite particles and which are not the agglomerated material of the primary particles, and the inorganic binding material which binds the plurality of zeolite particles to one another.

It is to be noted that when the zeolite particles subjected to the ion exchange treatment are not used as the zeolite particles, the formed and fired zeolite article may be subjected to the ion exchange treatment between cations of zeolite and the metal ions.

EXAMPLES

Hereinafter, the present invention will further specifically be described with respect to examples, but the present invention is not limited to these examples.

Example 1

As powder of coarse zeolite particles, there was prepared the powder of the coarse zeolite particles made of ZSM-5 type zeolite, subjected to 3 mass % ion exchange between cations of zeolite and copper ions and having an average particle diameter of 14 μm (hereinafter referred to as zeolite (1)). As powder of fine zeolite particles, there was prepared the powder of the fine zeolite particles made of β-type zeolite, subjected to 3 mass % ion exchange between cations of zeolite and iron ions and having an average particle diameter of 0.7 μm (referred to as zeolite (2)). It is to be noted that when a particle size distribution of zeolite is represented as a frequency distribution, a maximum frequency of zeolite (1) is 13%, and a maximum frequency of zeolite (2) is 20%. Table 1 indicates physical properties of the respective types of zeolite particles. In Table 1, column "crystal system" means the type of zeolite constituting the zeolite particles (the crystal system). Moreover, column "metal ion" means metal ions contained in the zeolite particles by an ion exchange treatment. "Cu" means copper ions, and "Fe" means iron ions.

To 2100 g of zeolite (1) and 1400 g of zeolite (2), as an inorganic binding material, 1400 g of boehmite having a specific surface area of 130 $m^2/g$ and 100 g of montmorillonite were added. Furthermore, as an organic binder, 200 g of hydroxypropyl methylcellulose (HPMC) was added. The materials were mixed by using a twin arm type kneader manufactured by Honda Machinery Works Co., Ltd. in a dry system for ten minutes, water was further added, and the mixed material was mixed and kneaded for 40 minutes while regulating viscosity of the mixed material, thereby obtaining a kneaded substance of zeolite (a zeolite raw material). Table 2 indicates a blending prescription of the zeolite raw material.

The obtained kneaded zeolite substance was extruded with a continuous kneading vacuum extrusion forming machine manufactured by Honda Machinery Works Co., Ltd., to extrusion-form a plate-like material having a width of 25 mm and a thickness of 5 mm, thereby obtaining a formed zeolite article. The obtained formed zeolite article was dried with a hot air drier at 80° C. for 12 hours, degreased with a firing furnace at 450° C. for five hours, and fired at 700° C. for four hours, to obtain a fired zeolite article (a zeolite structure).

It is to be noted that an average particle diameter of zeolite particles is a median diameter (d50) in a distribution of particle diameters of powder containing zeolite particles. The diameter was measured by a laser diffraction scattering process in conformity to JIS R1629. It is to be noted that "the maximum frequency" in the zeolite particles is a frequency (the maximum value of a distribution) at which the frequency (%) is maximized in a frequency distribution curve.

Moreover, the specific surface area which was BET specific surface area was measured by using a flow type specific surface area measuring device: "FlowSorb-2300 (trade name)" manufactured by Micromeritics, Inc. after a sample pretreatment where a sample was held at 200° C. for ten minutes. Here, the specific surface area is the surface area per unit mass indicating a value obtained by obtaining a molecule number (N) necessary for covering the surface of the sample with a monomolecular layer of a gas adsorbed in the surface of the sample, for example, by gas physical adsorption with B.E.T principle, multiplying this adsorption molecular number (N) by a molecule sectional area of the adsorbed gas to obtain the surface area of the sample, and dividing the surface area of this sample by the mass of the sample.

Moreover, the obtained zeolite structure was subjected to a four-point bending test in conformity to JIS R1601, to measure a bending strength of the zeolite structure. Table 3 indicates the measurement result of the bending strength. Moreover, Table 3 indicates the volume ratio of the coarse zeolite particles with respect to the whole volume of the zeolite particles (the volume ratio (vol %) of the coarse zeolite particles), and the volume ratio (vol %) of the inorganic binding material with respect to the whole volume of a zeolite material. It is to be noted that the zeolite material is a material constituting the zeolite structure, and the whole volume of the zeolite material is the whole volume of the zeolite structure.

TABLE 1

| Zeolite particles | Average particle diameter (μm) | Maximum frequency(%) | Agglomeration | Crystal system | Metal ion |
|---|---|---|---|---|---|
| Zeolite (1) | 14 μm | 13% | None | ZSM-5 type | Cu |
| Zeolite (2) | 0.7 μm | 20% | None | β-type | Fe |
| Zeolite (3) | 14 μm | 13% | None | ZSM-5 type | Fe |
| Zeolite (4) | 0.5 μm | 18% | None | ZSM-5 type | Fe |
| Zeolite (5) | 4 μm (primary particle diameter: 0.7 μm) | 9% | Present | β-type | Fe |

TABLE 2

| | Example 1 | Example 2 | Example 3 | Example 4 | Example 5 | Example 6 |
|---|---|---|---|---|---|---|
| Zeolite (1) | 2100 g | — | 3150 g | 1400 g | 2100 g | 2100 g |
| Zeolite (2) | 1400 g | — | 350 g | 2100 g | 1400 g | 1400 g |
| Zeolite (3) | — | 2100 g | — | — | — | — |
| Zeolite (4) | — | — | — | — | — | — |
| Zeolite (5) | — | 1400 g | — | — | — | — |
| Boehmite | 1400 g | 1400 g | 1400 g | 1400 g | — | — |
| Montmorillonite | 100 g | 100 g | 100 g | 100 g | 950 g | 300 g |
| HPMC | 200 g | 200 g | 200 g | 200 g | 200 g | 200 g |

TABLE 3

| | Example 1 | Example 2 | Example 3 | Example 4 | Example 5 | Example 6 |
|---|---|---|---|---|---|---|
| Volume ratio of coarse zeolite particles (vol %) | 60 | 60 | 90 | 40 | 60 | 60 |
| Volume ratio of inorganic binding material with respect to whole volume of zeolite material (vol %) | 17 | 17 | 17 | 17 | 15 | 5 |
| Bending strength (MPa) | 8.5 | 4.7 | 4.8 | 5.3 | 12 | 5.8 |

Example 2

As shown in Table 1 and Table 2, as powder of coarse zeolite particles, there was prepared powder of coarse zeolite particles made of ZSM-5 type zeolite, subjected to 3 mass % ion exchange between cations of zeolite and iron ions and having an average particle diameter of 14 μm (hereinafter referred to as zeolite (3)). As powder of fine zeolite particles, there was prepared an agglomerated material having an average particle diameter of 4 μm and including agglomerated fine zeolite particles (primary particles) made of β-type zeolite, subjected to 3 mass % ion exchange between cations of zeolite and iron ions and having an average particle diameter of 0.7 μm (referred to as zeolite (5)). It is to be noted that a maximum frequency of zeolite (3) is 13%, and a maximum frequency of zeolite (5) is 9%. Table 1 indicates physical properties of the zeolite particles.

A zeolite structure was manufactured and a bending strength thereof was measured in the same manner as in Example 1 except that 2100 g of zeolite (3) was used as the coarse zeolite particles and 1400 g of zeolite (5) was used as the fine zeolite particles as shown in Table 2.

Example 3

A zeolite structure was manufactured and a bending strength thereof was measured in the same manner as in Example 1 except that 3150 g of zeolite (1) was used as coarse zeolite particles and 350 g of zeolite (2) was used as fine zeolite particles as shown in Table 2.

Example 4

A zeolite structure was manufactured and a bending strength thereof was measured in the same manner as in Example 1 except that 1400 g of zeolite (1) was used as coarse zeolite particles and 2100 g of zeolite (2) was used as fine zeolite particles as shown in Table 2.

Example 5

A zeolite structure was manufactured and a bending strength thereof was measured in the same manner as in Example 1 except that 950 g of montmorillonite was used as an inorganic binding material as shown in Table 2.

Example 6

A zeolite structure was manufactured and a bending strength thereof was measured in the same manner as in Example 1 except that 300 g of montmorillonite was used as an inorganic binding material as shown in Table 2. Table 3 indicates the measurement results of the bending strengths of Examples 2 to 6, a volume ratio (vol %) of coarse zeolite particles, and a volume ratio (vol %) of the inorganic binding material with respect to the whole volume of a zeolite material.

Comparative Example 1

As shown in Tables 1 and 4, a zeolite structure was manufactured in the same manner as in Example 1 and a bending strength thereof was measured except that there were used 2100 g of powder of fine zeolite particles made of β-type zeolite, subjected to 3 mass % ion exchange between cations of zeolite and iron ions and having an average particle diameter of 0.7 μm (zeolite (2)) and 1400 g of powder of fine zeolite particles made of ZSM-5 type zeolite, subjected to 3 mass % ion exchange between cations of zeolite and iron ions and having an average particle diameter of 0.5 μm (hereinafter referred to as zeolite (4)). Table 5 indicates the measurement results. In Comparative Example 1, a zeolite structure was prepared by use of two types of fine zeolite particles. It is to be noted that the maximum frequency of zeolite (4) is 18%.

TABLE 4

|  | Comp. Ex 1 | Comp. Ex 2 | Comp. Ex 3 | Comp. Ex 4 | Comp. Ex 5 | Comp. Ex 6 |
| --- | --- | --- | --- | --- | --- | --- |
| Zeolite (1) | — | 3500 g | — | 1050 g | — | 2100 g |
| Zeolite (2) | 2100 g | — | 3500 g | 2450 g | 1400 g | 1400 g |
| Zeolite (3) | — | — | — | — | — | — |
| Zeolite (4) | 1400 g | — | — | — | — | — |
| Zeolite (5) | — | — | — | — | 2100 g | — |
| Boehmite | 1400 g | 1400 g | 1400 g | 1400 g | 1400 g | — |
| Montmorillonite | 100 g | 100 g | 100 g | 100 g | 100 g | 180 g |
| HPMC | 200 g | 200 g | 200 g | 200 g | 200 g | 200 g |

TABLE 5

|  | Comp. Ex 1 | Comp. Ex 2 | Comp. Ex 3 | Comp. Ex 4 | Comp. Ex 5 | Comp. Ex 6 |
| --- | --- | --- | --- | --- | --- | --- |
| Volume ratio of coarse zeolite particles (vol %) | 60 | — | — | 30 | 60 | 60 |
| Volume ratio of inorganic binding material with respect to whole volume of zeolite material (vol %) | 17 | 17 | 17 | 17 | 17 | 3 |
| Bending strength (MPa) | 3.5 | 2.5 | 3.3 | 3.7 | 2 | 2.9 |

Comparative Example 2

A zeolite structure was manufactured and a bending strength thereof was measured in the same manner as in Example 1 except that only 3500 g of zeolite (1) was used as shown in Table 4. In Comparative Example 2, the zeolite structure was prepared by using only coarse zeolite particles.

Comparative Example 3

A zeolite structure was manufactured and a bending strength thereof was measured in the same manner as in Example 1 except that only 3500 g of zeolite (2) was used as shown in Table 4. In Comparative Example 3, the zeolite structure was prepared by using only one type of fine zeolite particles.

Comparative Example 4

A zeolite structure was manufactured and a bending strength thereof was measured in the same manner as in Example 1 except that 1050 g of zeolite (1) was used as coarse zeolite particles and 2450 g of zeolite (2) was used as fine zeolite particles as shown in Table 4. In Comparative Example 4, the volume ratio of the coarse zeolite particles with respect to the whole volume of the zeolite particles is 30 vol %.

Comparative Example 5

A zeolite structure was manufactured and a bending strength thereof was measured in the same manner as in Example 1 except that 1400 g of zeolite (2) was used and 2100 g of zeolite (5) was used as shown in Table 4. In Comparative Example 5, fine zeolite particles and agglomerated fine zeolite particles were used to prepare the zeolite structure.

Comparative Example 6

A zeolite structure was manufactured and a bending strength thereof was measured in the same manner as in Example 1 except that 180 g of montmorillonite was used as an inorganic binding material as shown in Table 4. Table 5 indicates the measurement results of the bending strengths of Comparative Examples 2 to 6, a volume ratio (vol %) of coarse zeolite particles, and a volume ratio (vol %) of the inorganic binding material with respect to the whole volume of a zeolite material. It is to be noted that in Comparative Examples 2 and 3, only one type of zeolite particles is used, and hence the volume ratio (%) of the coarse zeolite particles is not described in Table 5. However, in Comparative Example 2, only particles corresponding to coarse particles are used, and hence the volume ratio of the coarse zeolite particles corresponds to 100 vol %. On the other hand, in Comparative Example 3, only particles corresponding to fine particles are used, and hence the volume ratio of the coarse zeolite particles corresponds to 0 vol %.

It is seen from Table 3 and Table 5 that the zeolite structures of Examples 1 to 6 have a high bending strength. Especially in Example 2 where the average particle diameter of the coarse zeolite particles is three or more times the average particle diameter of the fine zeolite particles, the bending strength becomes high. On the other hand, when the average particle diameter of the coarse zeolite particles is 1.4 times, the bending strength does not sufficiently improve.

Moreover, it is seen that in Example 2 where the volume ratio of the coarse zeolite particles with respect to the whole volume of the zeolite particles is 60 vol % and Example 3 where the volume ratio is 90 vol %, the bending strength becomes high. On the other hand, in the case of the only coarse zeolite particles as in Comparative Example 2 and the only fine zeolite particles as in Comparative Example 3, the bending strength does not sufficiently improve. Moreover, also in Comparative Example 4 where the volume ratio of the coarse zeolite particles with respect to the whole volume of the zeolite particles is 30 vol %, the bending strength does not sufficiently improve.

Furthermore, it is seen that in Comparative Example 5 where the agglomerated material of the zeolite particles are the coarse zeolite particles, the bending strength does not sufficiently improve. Moreover, when the amount of the inorganic binding material is excessively small as in Comparative Example 6, the bending strength lowers. When the volume ratio of the inorganic binding material with respect to the whole volume of the zeolite material is 5 vol % or more as in Example 5, the lowering of the bending strength due to lack of the inorganic binding material can be prevented.

A zeolite structure of the present invention can be used in an adsorbing material, a catalyst, a catalyst carrier, a gas separation film or an ion exchanger. In particular, the zeolite structure can preferably be utilized to purify an exhaust gas discharged from an engine for a car, an engine for a construction machine, an industrial stational engine, a burning apparatus or the like and containing NOx or the like.

Description of Reference Numerals

1: partition wall, 2: cell, 4: outer peripheral wall, 11: one end, 12: the other end, 31: zeolite powder, 32: zeolite particle, 32a: fine zeolite particle, 32b: coarse zeolite particle, 33: inorganic binding material, and 100 and 100a: zeolite structure.

What is claimed is:

1. A zeolite structure comprising:
   a zeolite material containing a plurality of zeolite particles and an inorganic binding material which binds the zeolite particles to one another,
   wherein the plurality of zeolite particles exhibits a bimodal particle size distribution having a first peak due to fine zeolite particles and a second peak due to coarse zeolite particles,
   the average particle diameter of the first peak is from 0.1 to 30 µm,
   the average particle diameter of the second peak is from 3 to 1,000 times that of the first peak, and a ratio of a volume of coarse zeolite particles with respect to the whole volume of the plurality of zeolite particles is from 40 90 vol %, and
   in the zeolite material, a ratio of a volume of the inorganic binding material with respect to the whole volume of the zeolite material is from 5 to 50 vol %,
   wherein a zeolite raw material containing the plurality of zeolite particles and the inorganic binding material is extruded to form a zeolite formed body which is then fired to obtain the zeolite structure.

2. The zeolite structure according to claim 1, wherein zeolite particles of at least a part of the plurality of zeolite particles are particles made of at least one type of zeolite selected from the group consisting of ZSM-5 type zeolite, β-type zeolite, Y-type zeolite, mordenite type zeolite and ferrierite type zeolite.

3. The zeolite structure according to claim 2, wherein zeolite particles of at least a part of the plurality of zeolite particles are particles made of zeolite subjected to ion exchange between cations of zeolite and ions of at least one metal selected from the group consisting of copper, iron, nickel, zinc, manganese, cobalt, silver, palladium, indium, cerium, gallium, titanium and vanadium.

4. The zeolite structure according to claim 3, wherein the fine zeolite particles and the coarse zeolite particles are particles made of zeolite subjected to ion exchange between cations of zeolite and different types of the metal ions, respectively.

5. The zeolite structure according to claim 4, wherein the fine zeolite particles are particles made of zeolite subjected to ion exchange between cations of zeolite and ions of at least one type of metal selected from the group consisting of iron, titanium and cobalt, and the coarse zeolite particles are particles made of zeolite subjected to ion exchange between cations of zeolite and ions of at least one type of metal selected from the group consisting of copper, manganese, silver, and vanadium.

6. The zeolite structure according to claim 5, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

7. The zeolite structure according to claim 4, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

8. The zeolite structure according to claim 3, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

9. The zeolite structure according to claim 2, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

10. The zeolite structure according to claim 1, wherein zeolite particles of at least a part of the plurality of zeolite particles are particles made of zeolite subjected to ion exchange between cations of zeolite and ions of at least one metal selected from the group consisting of copper, iron, nickel, zinc, manganese, cobalt, silver, palladium, indium, cerium, gallium, titanium and vanadium.

11. The zeolite structure according to claim 10, wherein the fine zeolite particles and the coarse zeolite particles are particles made of zeolite subjected to ion exchange between cations of zeolite and different types of the metal ions, respectively.

12. The zeolite structure according to claim 11, wherein the fine zeolite particles are particles made of zeolite subjected to ion exchange between cations of zeolite and ions of at least one type of metal selected from the group consisting of iron, titanium and cobalt, and the coarse zeolite particles are particles made of zeolite subjected to ion exchange between cations of zeolite and ions of at least one type of metal selected from the group consisting of copper, manganese, silver, and vanadium.

13. The zeolite structure according to claim 12, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

14. The zeolite structure according to claim 11, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

15. The zeolite structure according to claim 10, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

16. The zeolite structure according to claim 1, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

17. The zeolite structure according to claim 1, which is formed in a honeycomb shape including partition walls disposed to form a plurality of cells which become through channels of a fluid and which extend from one end face to the other end face.

\* \* \* \* \*